Dec. 8, 1953     J. J. BERLES     2,661,535
COMESTIBLE CHOPPING DEVICE
Filed May 21, 1952
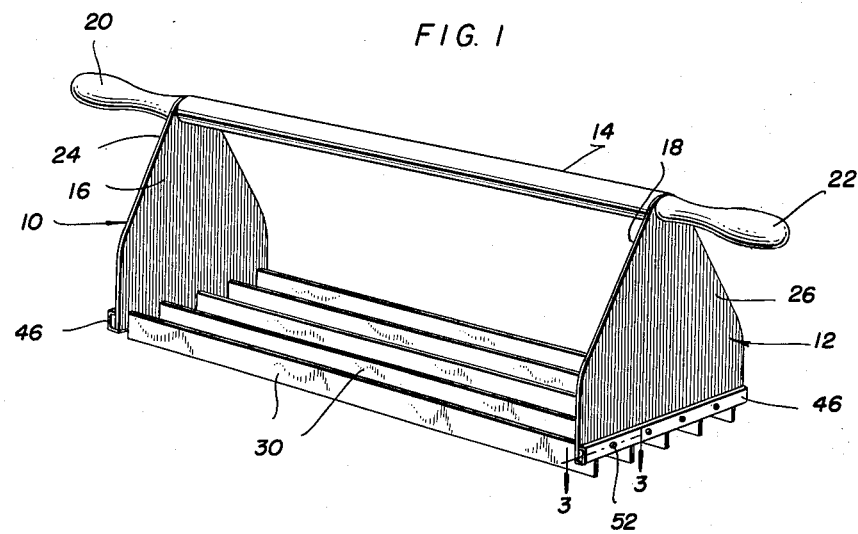
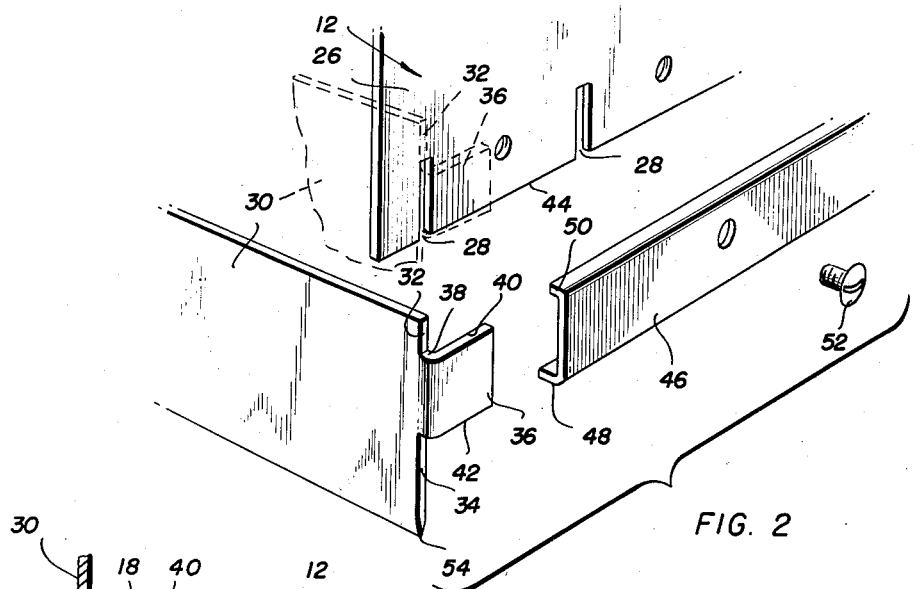
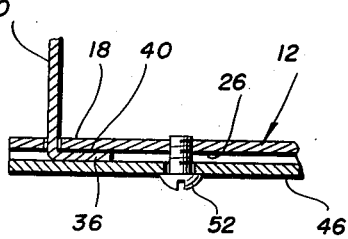
INVENTOR.
JAMES J. BERLES
BY
ATTORNEYS / Patented Dec. 8, 1953

2,661,535

UNITED STATES PATENT OFFICE 2,661,535

COMESTIBLE CHOPPING DEVICE

James J. Berles, Fort Wayne, Ind.

Application May 21, 1952, Serial No. 289,133

3 Claims. (Cl. 30—305)

The present invention relates to a device for cutting or chopping comestibles such as meat and the like, and more particularly to a chopping device capable of making multiple cuts with a single stroke.

A principal object of this invention is to provide a chopping device capable of producing a plurality of cuts simultaneously by a single operation thereof. It is a further object to provide a chopping device having a plurality of cutting blades uniquely supported on a frame for convenient removal therefrom for the purpose of cleaning the device and sharpening the blades. It is a still further object to provide a cutting device having blades which are removably secured in spaced apart relation, by means of a pair of clamping elements to a supporting structure. Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific instructions illustrated and described, so long as the scope of the appended claims is not violated.

In the drawings, Fig. 1 is a perspective illustration of an embodiment of this invention;

Fig. 2 is an exploded fragmental perspective view of a portion of the embodiment of Fig. 1; and Fig. 3 is a partial section taken substantially on section line 3—3 of Fig. 1.

Referring to the drawings, and more particularly to Fig. 1, a chopping device of this invention is shown as being comprised of two flat end plates 10 and 12 which are spaced apart and held in parallel relation. Part of the supporting structure holding the end plates together is a bar or cross member 14 which extends between the upper inner surfaces 16 and 18 of the plates 10 and 12, respectively. Any suitable means may be used for attaching the cross member 14 to the end plates, such as, for example, screws or rivets. Two handles 20 and 22 which may be gripped by an operator's hands are secured to the outer sides 24 and 26, respectively, of the end plates 10 and 12, respectively. These handles are preferably arranged to extend outwardly from the ends of the bar 14, and in co-axial relationship therewith. As will become apparent hereafter, either the handles 20, 22 or the cross bar 14 may be gripped by an operator for manipulating the device, for obtaining a variety of chopping actions.

The edges of the end plates 10 and 12 opposite the above-described handles, are provided with inwardly extending slots 28 having a depth sufficient for the purpose to be explained hereafter.

A plurality of cutting or knife blades 30 are fitted between the inner sides 16 and 18 of the plates 10 and 12, respectively. Each blade 30 has a principal length which is substantially equal to the distance between the inner plate surfaces 16 and 18, both ends of each blade 30 being provided with upper and lower end shoulders 32 and 34 which are spaced apart by means of a right angle flange 36. As will be seen by the dotted line assembly of Fig. 2, the shoulders 32 are adapted to engage the inner surfaces of the respective plates 10 and 12, thereby positively positioning said plates against endwise movement. As will be seen by a close examination of Fig. 2, the shank portion 38 of the right angle flange 36 fits into the slot 28, and is of such length as to allow the firm engagement by the inner side 40 of the flange 36 with the outer surface 26 of the end plate 12. Of course, a similar flange 36 is arranged to fit into the slots of the end plate 10 and to engage the outer surfaces 24 thereof.

It will be noted at this point, that the depth of the slots 28 is approximately equal to the width of the flange 36 so that when the blades 30 are assembled to the end plates 10 and 12, the lower edges 42 of the flanges 36 will align substantially flush with the bottom edges 44 of the end plates.

The blades 30 are removably secured to the end plates by means of channel-shaped members or clamping elements 46 which are provided with two upstanding, longitudinally extending sides 48 and 50, side 50 having a length substantially equal to the thickness of the flange 36, and side 48 having a length substantially equal to the combined thicknesses of the flange 36, and one of the end plates 10, 12. The distance between the two sides 48 and 50 is made substantially equal to the width of the flange 36 so that upon assembling the clamp 46, all of the flanges 36 projecting from either one of the end plates 10, 12 are snugly engaged thereby and rigidly fastened to the end plates by means of the screws 52 which fasten the clamps 46 to the respective plates. With this arrangement, the knives 30 are rigidly held in place, and are prevented from tilting by reason of the engagement with the slots 28 and with the sides 48, 50 of the clamp 46. This being so, the operator may exert considerable force when using the chopper without fear of damaging any part thereof by reason of the lack of a firm connection between the knives and the associated supporting structure.

As will be seen more clearly in Fig. 1, the lower leg 48 of the clamp 46 engages the bottom edges 42, 44 of the flanges 36 and of the end plates 10, 12, respectively. Thus, a firm clamping engagement is provided for preventing accidental extraction of the blades 30 from the respective slots 28.

In operation, the handles 20 and 22 may be gripped by the operator's hands for manipulating the instrument in such a manner as to move forceably the cutting edges 54 of the blades 30 into contact with the substance being cut. Or, the device may be operated in such a manner that the cutting edges 54 may be drawn over the material for slicing or slitting the same. In any event, where any quantity of material is being chopped, by the use of this invention, the chopping action will be greatly multiplied over that which may be accomplished by the use of a single bladed instrument.

This invention is particularly adapted to be disassembled for the purpose of cleaning and sharpening the blades 30. Obviously, some foodstuffs when being chopped will flow into some of the cracks and crevices between the various parts and this material should be removed to obviate the possibility of food poisoning due to decayed or rotted food.

What is claimed is:

1. A comestible chopping device comprising two rigid spaced apart plates arranged in parallel planes, a bar secured between said end plates and serving dual functions as a handle and as a rigidifying member, each end plate having a plurality of parallel extending slots cut along the edge opposite said bar, the slots in each plate being arranged symmetrically opposite the slots in the other plate, a plurality of knife blades transversely extending between said plates and being received in and supported by said slots, each blade having on its opposite ends right angle flanges which engage the outer sides of said plates, and a clamping bar of U-shaped cross section for each end plate and secured to said each plate in such a manner that all of the blade flanges are embraced and rigidly attached to the plate and are thereby restrained against movement with respect to the aforesaid slots.

2. A comestible chopping device comprising two rigid spaced apart end plates arranged in parallel planes, a bar secured between said end plates and serving dual functions as a handle and as a rigidifying member, each end plate having a plurality of parallel extending slots cut along the edge opposite said bar, a plurality of knife blades transversely extending between said plates and being received in and supported by said slots, each blade having on its opposite ends right angle flanges which engage the outer sides of said plates, and a clamping bar of U-shaped cross section for each end plate and secured to said each plate in such a manner that all of the blade flanges are embraced and rigidly attached to the plate thereby retaining the blades against movement in the respective slots.

3. A comestible chopping device comprising two rigid shaped apart end plates arranged in parallel planes, a cross member secured at its ends to said plates for securing the latter together, each end plate having a plurality of parallel extending slots cut along the edge opposite said bar, a plurality of knife blades transversely extending between said plates and being received in and supported by said slots, each blade having on its opposite ends right angle flanges which engage the outer sides of said plates, and a clamping bar of U-shaped cross section for each end plate and secured to said each plate in such a manner that all of the blade flanges are embraced and rigidly attached to the plate thereby retaining the blades against movement in the respective slots.

JAMES J. BERLES.

References Cited in the file of this patent

UNITED STATES PATENTS

| Number | Name | Date |
| --- | --- | --- |
| 639,850 | Hahn | Dec. 26, 1899 |
| 648,540 | Thacher | May 1, 1900 |
| 1,178,363 | Waring | Apr. 4, 1916 |
| 2,502,157 | Klejna | Mar. 28, 1950 |

FOREIGN PATENTS

| Number | Country | Date |
| --- | --- | --- |
| 131,764 | Great Britain | Sept. 4, 1919 |